(12) United States Patent
Nielsen et al.

(10) Patent No.: US 12,270,820 B2
(45) Date of Patent: Apr. 8, 2025

(54) EJECTION SUBASSEMBLY PITCHES TO MATCH NANOWELL SPACING

(71) Applicant: HEWLETT-PACKARD DEVELOPMENT COMPANY, L.P., Spring, TX (US)

(72) Inventors: Jeffrey A. Nielsen, Corvallis, OR (US); Christie Dudenhoefer, Corvallis, OR (US); Debora J. Thomas, Corvallis, OR (US); Roberto A Pugliese, Corvallis, OR (US); Diane R. Hammerstad, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1073 days.

(21) Appl. No.: 17/044,996

(22) PCT Filed: Jun. 4, 2018

(86) PCT No.: PCT/US2018/035887
§ 371 (c)(1),
(2) Date: Oct. 2, 2020

(87) PCT Pub. No.: WO2019/236053
PCT Pub. Date: Dec. 12, 2019

(65) Prior Publication Data
US 2021/0165007 A1     Jun. 3, 2021

(51) Int. Cl.
*G01N 35/10* (2006.01)
*B01L 3/00* (2006.01)
*B01L 3/02* (2006.01)

(52) U.S. Cl.
CPC ............ *G01N 35/10* (2013.01); *B01L 3/0268* (2013.01); *B01L 3/5085* (2013.01);
(Continued)

(58) Field of Classification Search
CPC ................. B01L 3/5085; B01L 3/0268; B01L 2400/0439; B01L 2400/0442;
(Continued)

(56) References Cited

U.S. PATENT DOCUMENTS 5,915,284 A    6/1999  Meltzer
6,773,566 B2 * 8/2004  Shenderov ............ F04B 19/006
                                                204/600
(Continued)

FOREIGN PATENT DOCUMENTS

WO    WO-1998020019    5/1998
WO    WO-2000001798    1/2000

OTHER PUBLICATIONS

Koltay, Non-contact Micro Dispensing Technologies for Science and Industry, Lab for MEMS Applications, Dept of Microsystems Engineering, 2012, IMTEK, University of Frieberg, <https://www.imtek.de/data/lehrstuehle/app/dokumente/conferences-pdf/conferences-2012/koltay-non-contact-microdispensing.pdf>..
(Continued)

*Primary Examiner* — Shogo Sasaki
(74) *Attorney, Agent, or Firm* — Foley & Lardner LLP

(57) ABSTRACT

In one example in accordance with the present disclosure, a fluidic die is described. The fluidic die includes a plurality of ejection subassemblies. Each ejection subassembly includes an ejection chamber to hold a volume of fluid and an opening through which the volume of fluid is ejected via a fluid actuator. A pitch of the ejection subassemblies aligns with a spatial arrangement of nanowells in an array of nanowells on a substrate.

15 Claims, 7 Drawing Sheets

(52) U.S. Cl.
CPC ............. *B01L 2300/0809* (2013.01); *B01L 2300/0893* (2013.01); *B01L 2300/0896* (2013.01); *B01L 2400/0439* (2013.01); *B01L 2400/0442* (2013.01); *G01N 2035/1034* (2013.01)

(58) Field of Classification Search
CPC ..... B01L 2300/0893; B01L 2300/0809; B01L 2300/0896; B01J 2219/00317; B01J 2219/00378; G01N 35/10; G01N 2035/1034
See application file for complete search history.

(56) References Cited

U.S. PATENT DOCUMENTS

| | | |
|---|---|---|
| 7,169,616 B2 | 1/2007 | Johnson |
| 8,921,282 B2 | 12/2014 | Tajima |
| 9,248,445 B2 | 2/2016 | Okamoto |
| 9,714,940 B2 | 7/2017 | Lowery |
| 2017/0136456 A1 | 5/2017 | Chen |

OTHER PUBLICATIONS

Q. Li, Automatic Combination of Microfluidic Nanoliter-Scale Droplet Array with High-Speed Capillary Electrophoresis, Dec. 4, 2015, Scientific Reports, 6:26654.

* cited by examiner

EJECTION SUBASSEMBLY PITCHES TO MATCH NANOWELL SPACING

BACKGROUND

An assay is a process used in laboratory medicine, pharmacology, analytical chemistry, environmental biology, and molecular biology to assess or measure the presence, amount, or functional activity of a sample. The sample may be a drug, a genomic sample, a proteomic sample, a biochemical substance, a cell in an organism, an organic sample, or other inorganic and organic chemical samples. In general, an assay is carried out by dispensing small amounts of fluid into multiple wells of a titration plate. The fluid in these wells can then be processed and analyzed. Such assays can be used to enable drug discovery as well as facilitate genomic and proteomic research.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
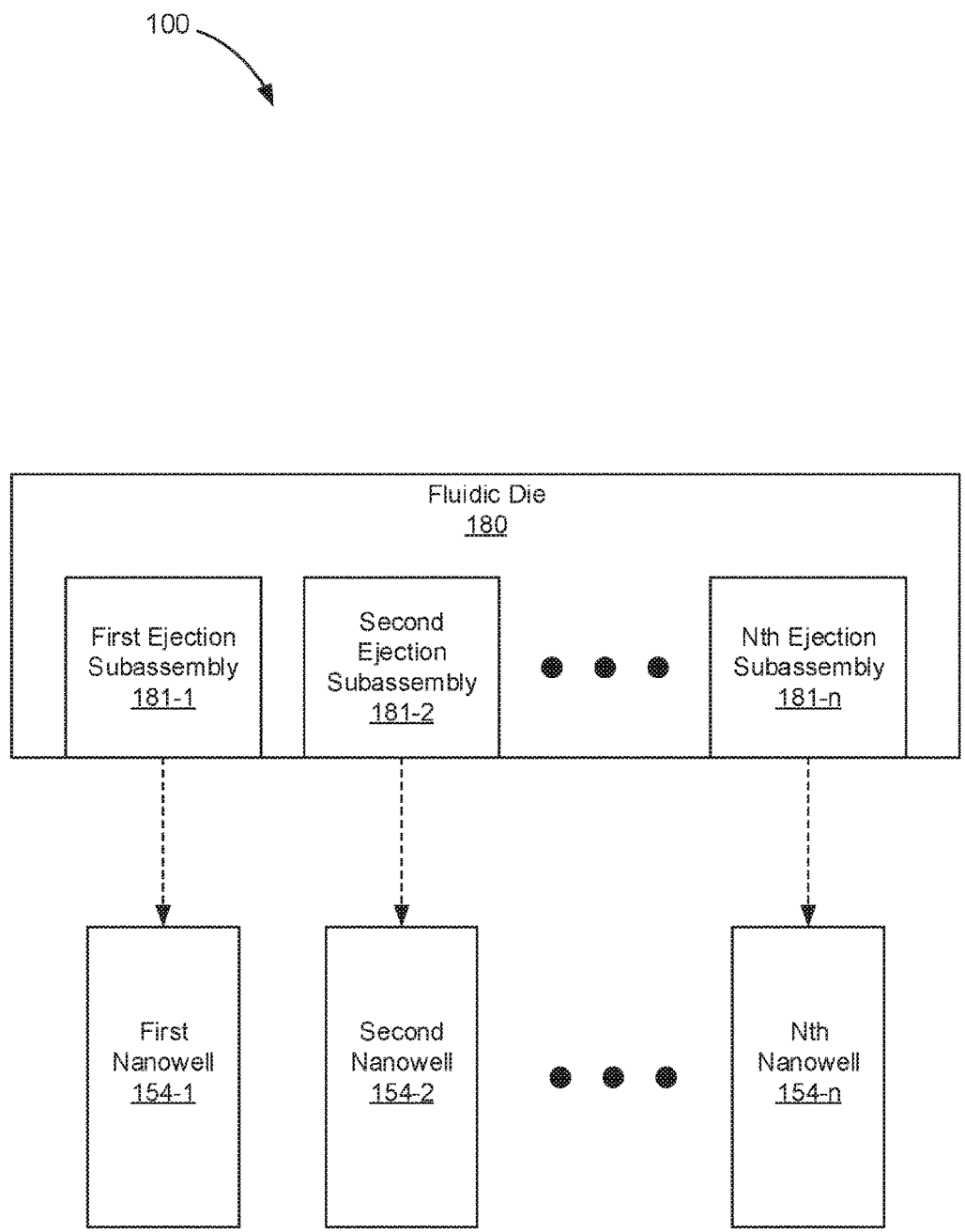
FIG. 1 is a block diagram of a fluidic die with ejection subassemblies having pitches that match nanowell spacing, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An assay is a process used in laboratory medicine, pharmacology, analytical chemistry, environmental biology, and molecular biology to assess or measure the presence, amount, or functional activity of a sample. The sample may be a drug, a genomic sample, a proteomic sample, a biochemical substance, a cell in an organism, an organic sample, or other inorganic and organic chemical samples. In general, an assay is carried out by dispensing small amounts of fluid into multiple wells of a titration plate. The fluid in these wells can then be processed and analyzed. Such assays can be used to enable drug discovery as well as facilitate genomic and proteomic research.

Such assays have been performed manually. That is, a user fills fluid into a single channel pipette, or a multi-channel pipette, and manually disperses a prescribed amount of fluid from the pipette into various wells of a titration plate. As this process is done by hand, it is tedious, complex, and inefficient. Moreover, it is prone to error as a user may misalign the pipette with the wells of the titration plate and/or may dispense an incorrect amount of fluid. In some examples, the fluid deposited into the titration plate may be expensive/valuable. In these cases misalignment and spillage may be quite costly. Still further, such manual deposition of fluid may be incapable of dispensing low volumes of fluid, for example in the picoliter range.

In some examples however, digital dispensing of fluid is replacing manual dispensing methods. In these examples, high precision digital fluid ejection devices, referred to herein as fluidic dies, are used. A fluidic die includes a number of ejection subassemblies. Each ejection subassembly holds a small volume of fluid and an actuator expels that fluid through an opening. In operation, the fluidic dies dispense the fluid into wells of a titration plate positioned below the fluidic dies. A fluidic ejection system holds the fluidic dies and the titration plate. This fluidic ejection system controls fluid ejection from the fluidic dies into the wells. As part of this, the fluidic ejection system may properly position the fluidic dies with respect to the titration plate by moving either the fluidic dies or the titration plate.

While fluidic die have undoubtedly advanced digital titration, some characteristics impede their more complete implementation. For example, in systems that rely on such fluidic die, a single ejection subassembly may be used to eject fluid into a well. The fluidic die is then moved across wells and this same ejection subassembly fills each well of the titration plate. This process may take a large amount of time and may increase the costs associated with laboratory processes.

Accordingly, the present specification describes a fluidic die and system that address this and other issues. Specifically, the present specification describes a faster method of depositing fluid into the wells of a titration plate. As described herein, a processor of a fluidic system actuates a plurality of ejection subassemblies on at least one fluidic die. In this example, the ejection subassemblies of the fluidic die have a pitch that matches the pitch of the nanowells on a substrate. Using such a nanowell-aligned ejection fluidic die 1) facilitates a reduction in the number of fluidic die used within the fluidic ejection system and 2) minimizes alignment errors.

Specifically, the present specification describes a fluidic die. The fluidic die includes a plurality of ejection subassemblies. Each ejection subassembly includes an ejection chamber to hold a volume of fluid and an opening through which the volume of fluid is ejected via a fluid actuator. A pitch of the ejection subassemblies matches a spatial arrangement of nanowells in an array of nanowells on a substrate.

The present specification also describes a fluid ejection system. The fluidic ejection system includes 1) a substrate stage to hold a substrate that comprises an array of nanowells and 2) an ejection head received in an interface. The ejection head includes at least one fluidic die. A fluidic die includes a plurality of ejection subassemblies where each ejection subassembly 1) includes an ejection chamber to hold a volume of fluid and an opening through which the volume of fluid is ejected via a fluid actuator and 2) ejects fluid into nanowells of the array of nanowells. In this example, a pitch of the ejection subassemblies on the fluidic die matches a spatial arrangement of nanowells of the array of nanowells.

The present specification also describes a method of ejecting fluid into an array of nanowells. According to the method, a fluid is received at a fluidic die of an ejection head. A plurality of ejection subassemblies of the fluidic die then eject the fluid into at least one group of nanowells of the array of nanowells. In this example a pitch of the ejection subassemblies matches a spatial arrangement of the nanowells and each of the ejection subassemblies ejects fluid into one of the nanowells.

As used in the present specification and in the appended claims, the term "fluidic die" refers to a component of a fluidic ejection system that ejects fluid and includes a number of ejection subassemblies.

Accordingly, as used in the present specification and in the appended claims, the term "ejection subassembly" refers to an individual component of a fluidic die that ejects fluid. The ejection subassembly may be referred to as a nozzle and includes at least an ejection chamber to hold an amount of fluid and an opening through which the fluid is ejected. In some examples, the ejection subassembly includes an actuator disposed within the ejection chamber.

Further, as used in the present specification and in the appended claims, the term "ejection head" refers to a component received in a fluidic system that includes multiple fluidic die. In one example, an ejection head may be removably inserted into a fluidic system. In another example, the ejection head may be integrated into the fluidic system.

Even further, as used in the present specification and in the appended claims, the term "pitch" is meant to be understood broadly as a distance between two adjacent ejection subassemblies in a fluidic die. In one example, the pitch of an array of ejection subassemblies may be measured from the center of one opening to the center of an adjacent opening.

Even further, as used in the present specification and in the appended claims, the term "match" refers to an alignment being the same, or close enough such that fluid from ejection subassemblies fall into the corresponding nanowells.

Turning now to the figures, FIG. 1 is a block diagram of a fluidic die (180) with ejection subassemblies (181) having pitches that match nanowell (154) spacing, according to an example of the principles described herein. As described above, a fluidic die (180) is received at a fluidic system. The fluidic die (180) is used to dispense fluid onto a substrate such as nanowells of a titration plate. The nanowells (154) into which the fluid is dispensed may have an inlet that is less than 1.1 millimeter (mm) in diameter.

Returning to the fluidic die (180), the fluidic die (180) may be received in a digital fluid ejection system used to dispense solvent-based pharmaceutical compounds and solutions of biomolecules including, for example, proteins, enzymes, lipids, mastermix, DNA samples, among others, into a number of wells of a well plate or onto other types of substrates. The digital fluid ejecting system may be used in titration processes, compound secondary screening, enzyme profiling, and polymerase chain reactions (PCR), among other chemical and biochemical reactions.

Figure 4:
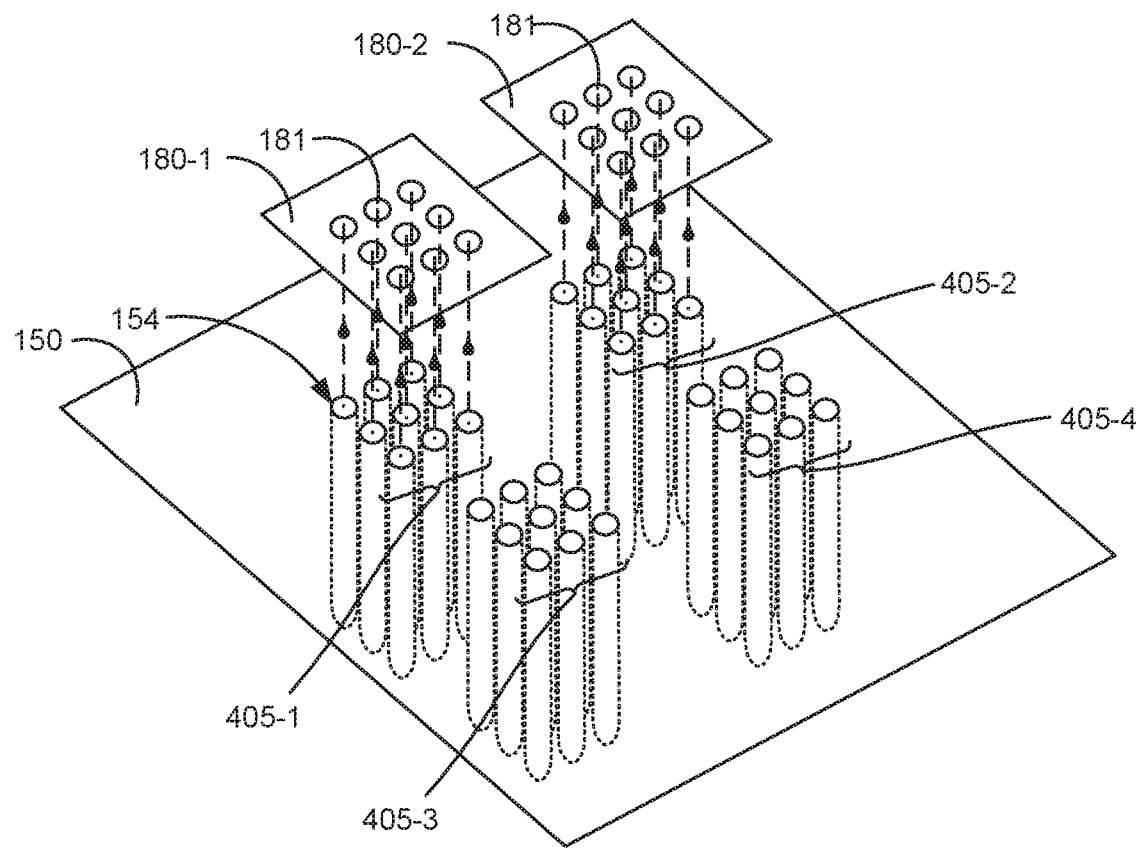
FIG. 4 is a perspective view of an array of nanowells and a plurality of fluidic dies with ejection subassemblies having pitches that match nanowell spacing, according to an example of the principles described herein.

The fluidic die (180) may include a plurality of ejection subassemblies (181-1, 181-2, 181-n) used to eject fluid from the fluidic die (180). Note that while FIG. 1 depicts a certain number of ejection subassemblies (181), any number of ejection subassemblies (181) may be included within the fluidic die (180). In some examples, the plurality of ejection subassemblies (181) may be arranged in an N×N array, for example as depicted in FIG. 4. Note that in this example, N may be any value including 1, in which the ejection subassemblies (181) are arranged as a single column.

As described above, the ejection subassemblies (181) are individual components of a fluidic die (180) that eject fluid. A specific example of ejection subassemblies (181) is provided in FIGS. 3A and 3B. The use of such ejection subassemblies (181) allows the fluidic die (180) to dispense individual drops of between approximately 1.0 and 500 picoliters in volume. Such small volumes conserve the fluid while still allowing sufficient fluid to be passed to the nanowells (154) for laboratory purposes. This may result in a cost savings to a user by minimizing waste of valuable fluid samples used in the various reactions taking place between the fluids introduced into the nanowells (154) by the ejection subassemblies (181) of the fluidic die (180).

The pitch of the fluid ejection subassemblies (181) on the fluidic die (180) matches a spatial arrangement of a number of nanowells (154-1, 154-2, 154-n) in an array of nanowells as indicated by the dashed lines. That is, a spacing between adjacent ejection subassemblies (181) may be the same as a spacing between adjacent nanowells (154) on a substrate. The pitch of the fluid ejection subassemblies (181) may be such that each of the fluid ejection subassemblies (181) dispenses fluid into one of the nanowells (154). Such an alignment reduces the potential for fluid to be deposited between the nanowells (154), provides precise control over dispensed fluid volumes, and enables higher throughput relative to other systems and methods. Such precise alignment also prevents contamination. That is, the present fluidic die (180) allows for the fluid to be completely dispensed within the nanowells (154) without some device, such as a pipette, contacting the sides of nanowells (154), which contact may result in sample contamination.

In some examples, the different ejection subassemblies (181-1, 181-2, 181-n) may eject fluid into a plurality of nanowells (154-1, 154-2, 154-n) without x or y translation of the fluidic die (180) relative to the substrate, reducing the time it takes to dispense fluids into the nanowells (154).

Figure 2:
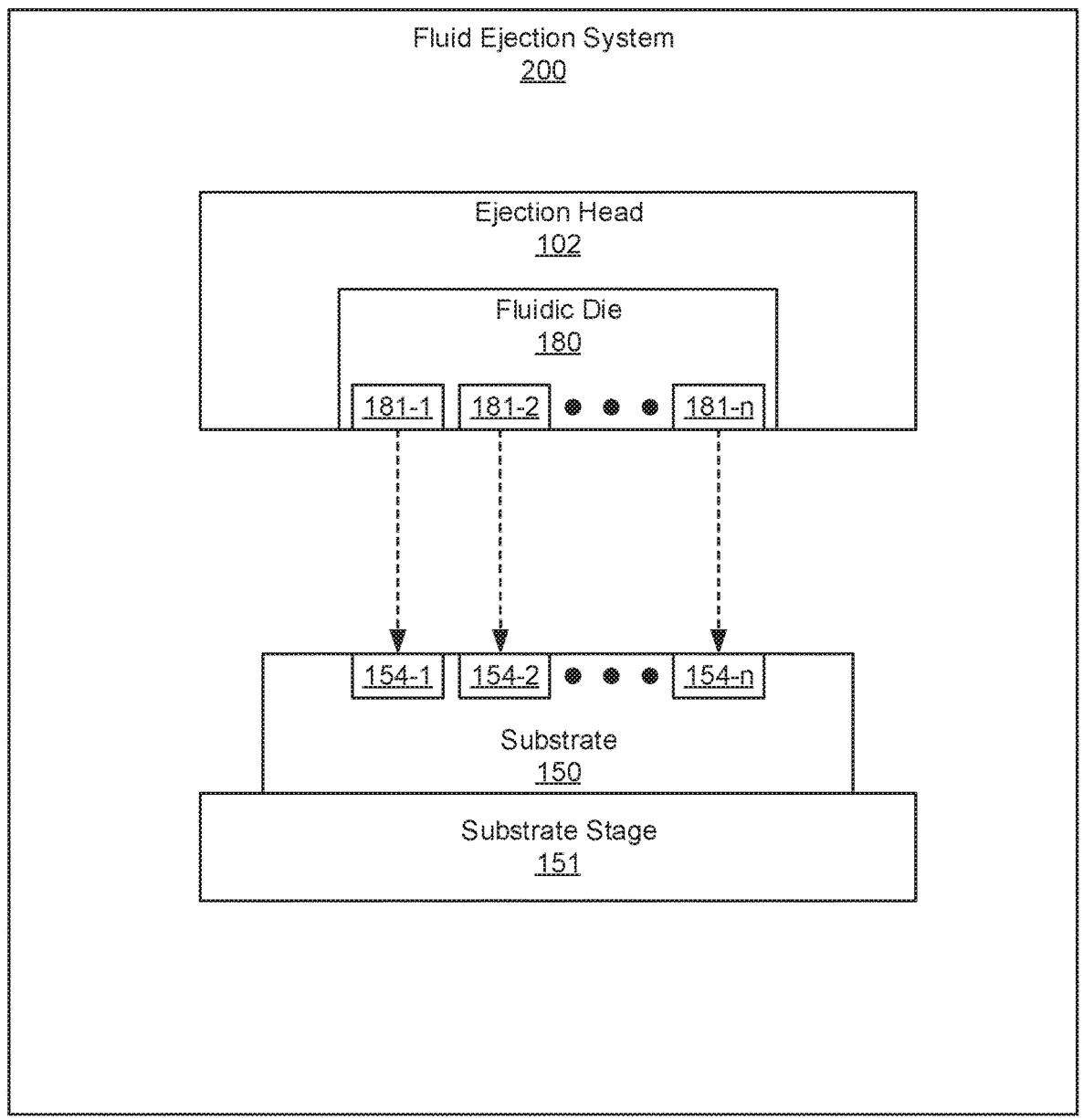
FIG. 2 is a block diagram of a fluid ejection system with ejection subassemblies having pitches that match nanowell spacing, according to an example of the principles described herein.

FIG. 2 is a block diagram of a fluid ejection system (200) with ejection subassemblies (181) having pitches that match nanowell (154) spacing, according to an example of the principles described herein. The fluid ejection system (200) receives, at an interface, an ejection head (102). As described above, the ejection head (102) is a component that includes any number of fluidic die (180) and their corresponding ejection subassemblies (181). In some examples, the ejection head (102) is removable from the fluid ejection system (200) for example as a replaceable cassette. A removable ejection head (102) may include ejection subassemblies (181) on a bottom side and an equal number of or fewer reservoirs on a top side, which reservoirs may be open at the top to receive fluid and are fluidly coupled to the ejection subassemblies (181). In another example, the ejection head (102) is integrated into a cartridge that contains the fluid to be ejected.

The fluid ejection system (200) may also include a substrate stage (151) to retain a substrate (150). As described above, the substrate (150) may move relative to the ejection head (102) such that fluid can be deposited in different regions of the substrate (150). For example, a titration plate containing nanowells may move such that the ejection subassemblies (181) align with, and deposit fluid into, different groups of nanowells (154). Accordingly, the fluid ejection system (200) may move the ejection head (102) and/or the substrate stage (150) relative to one another. In one specific example, the substrate stage (151) moves as instructed by a processing device of the fluid ejection system (200) in order to place a number of nanowells (154) below the ejection subassemblies (181) of the ejection head (102) to receive a fluid. For example, the substrate stage (150) may move in any combination of x. y, and z coordinate directions as indicated by the coordinate indicator (250).

In another example, the ejection head (102) moves as instructed by a processing device of the fluid ejection system (200) in order to place a number of ejection subassemblies (181) above the nanowells (154) of the substrate (150) to receive a fluid. For example, the ejection head (102) may move in any combination of x. y, and z coordinate directions as indicated by the coordinate indicator (250).

The substrate (150) may be secured to the substrate stage (151) during movement of the substrate stage (151) and/or the fluidic die (180). The substrate (150) may be any object on which fluid may be dispensed, which object has a predisposition to expect to receive fluid at particular locations. In one example, the substrate (150) may be a titration plate that includes a number of nanowells (154) formed in an array.

As described above, the substrate (150) may include a number of nanowells (154) defined therein. The nanowells (154) may be laid out in an array and may have a pitch and density that matches the pitch of a plurality of ejection subassemblies (181). In one example, the inlets of the nanowells (154) and the nozzles (FIG. 3, 303) may be circular. However, in another example, the inlets of the nanowells (154) and the openings in the ejection subassemblies may have any non-circular shape including other symmetrical and non-symmetrical shapes. Specific examples of ejection subassemblies (181) are provided in detail below in FIGS. 3A and 3B.

Figure 3A:
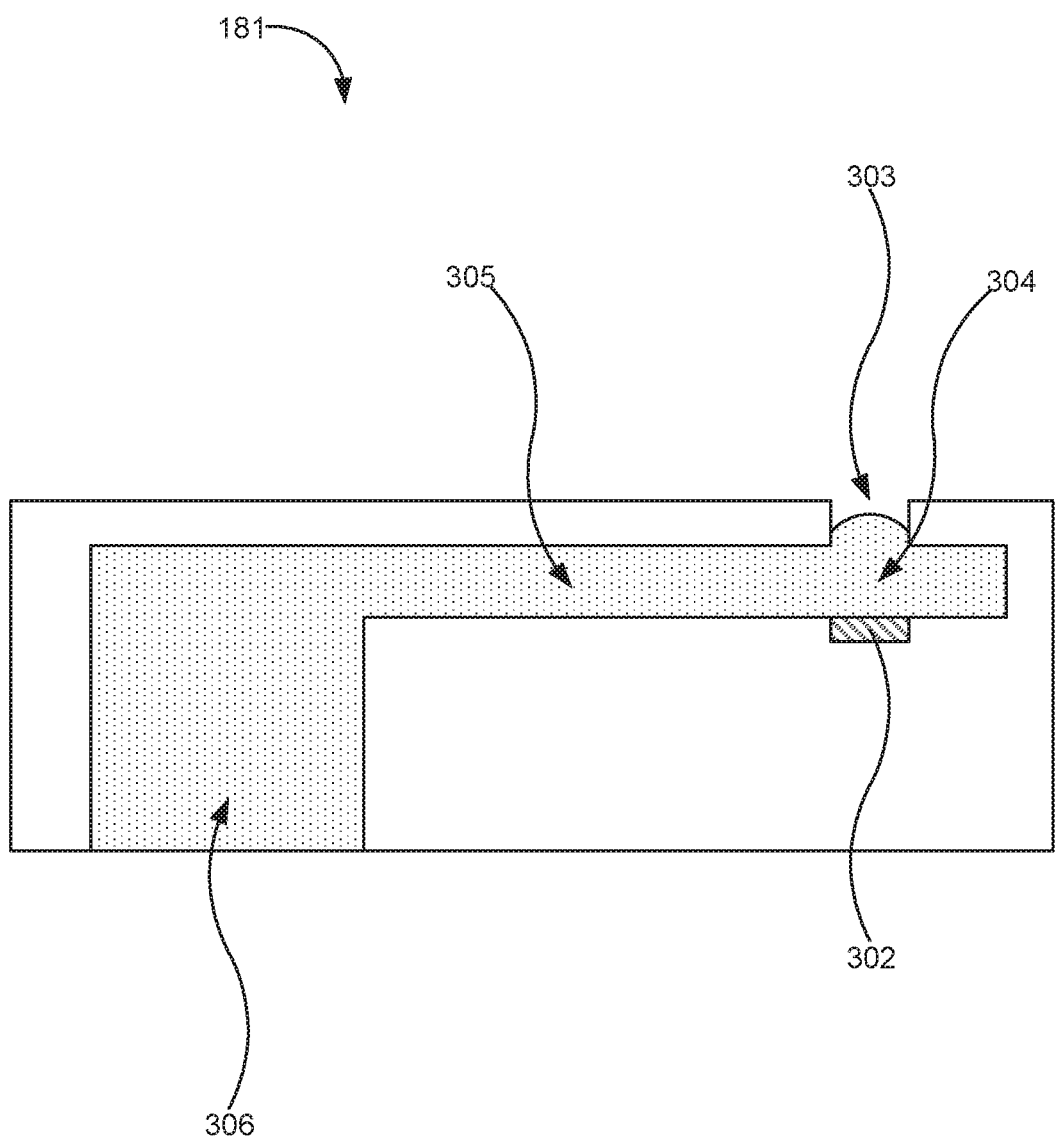
FIGS. 3A and 3B are diagrams of ejection subassemblies, according to examples of the principles described herein.
Figure 3B:
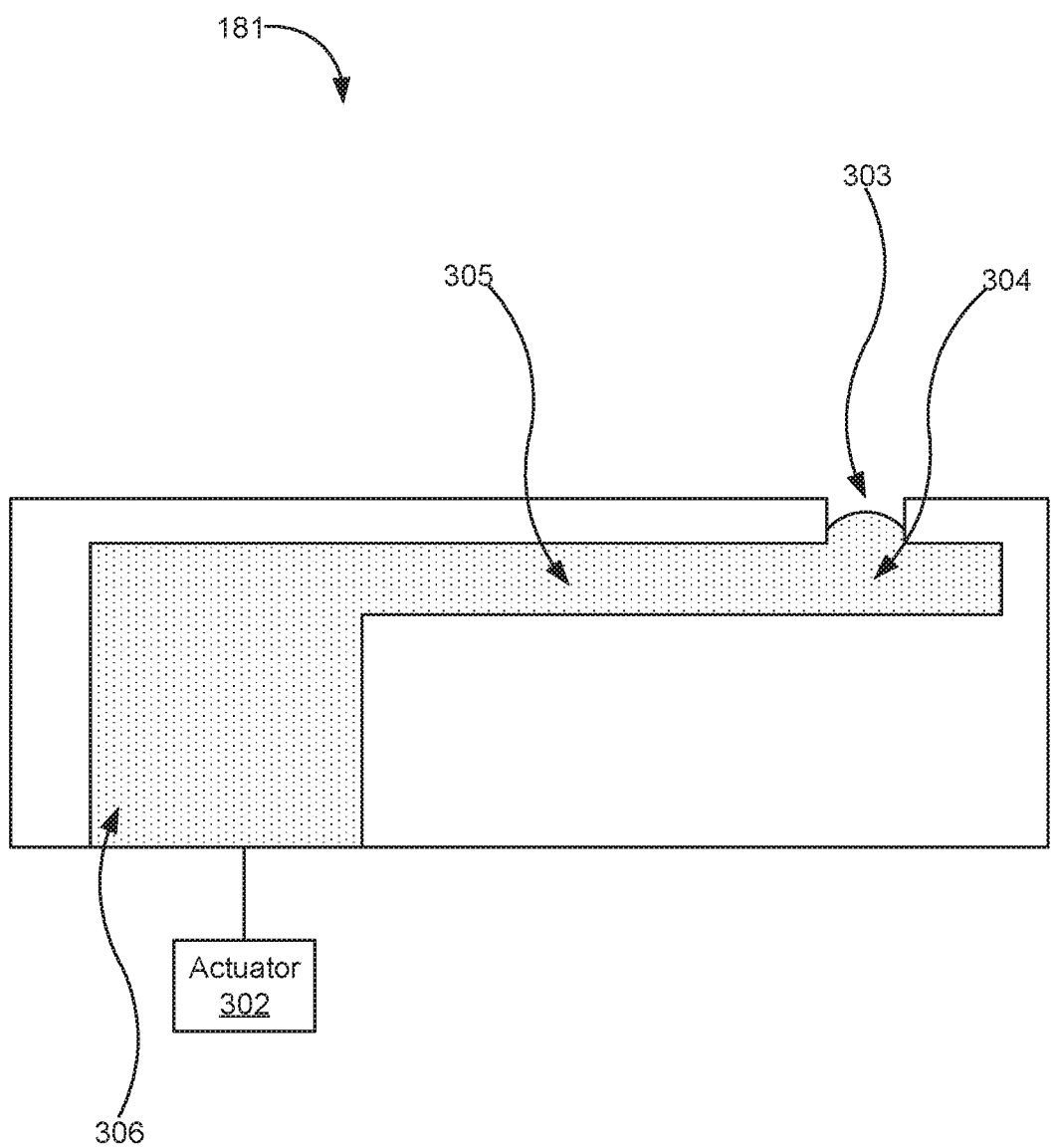

FIGS. 3A and 3B are diagrams of ejection subassemblies (181) of the fluidic die (180), according to another example of the principles described herein. Specifically, FIG. 3A is an ejection subassembly (181) with the fluid actuator (302) disposed within the ejection chamber (304) and FIG. 3B is an ejection subassembly (181) with the fluid actuator (302) disposed at another location.

To facilitate fluidic ejection, the ejection subassembly (181) may include a number of passageways, channels, and chambers in which a fluid circulates or moves. In one example, a fluid slot (306) is formed within a portion of the fluidic die (FIG. 1, 180) and delivers fluid to a fluid channel (305). The fluid channel (305) delivers fluid to an ejection chamber (304) formed within the fluidic die (180).

As depicted in FIG. 3A, in some examples, an actuator (302) is disposed within an ejection chamber (304). The actuator (302) ejects a volume of the fluid out of an opening (303) in the ejection chamber (304), and into a number of nanowells (FIG. 1, 154) of a substrate (FIG. 2, 150).

The actuators (302) may be, for example, thermal heating devices used to form a drive bubble of vaporized fluid separated from liquid fluid by a bubble wall. The drive bubble may be used to force the fluid from the fluid ejection chamber (304) and out the opening (303). Once the drive bubble collapses, additional fluid from a reservoir may flow into the fluid slot (306), fluid channel (305), and fluid ejection chamber (304), replenishing the lost fluid volume from the creation of the drive bubble and the ejection of the fluid. This process may be repeated each time the fluidic die (FIG. 1, 180) is instructed to eject fluid. In another example, the actuator (302) may be piezoelectric actuators to generate a pressure pulse that forces a volume of the fluid out of the opening (303). In this example, the piezoelectric actuators may include a piezoelectric material that has a polarization orientation that provides a motion into the fluid ejection chamber (304) when an electrical charge is applied to the piezoelectric material.

As described above and as depicted in FIG. 3B, in one example, the actuator (302) may be located separate from the fluid ejection subassemblies (181), either on, or off of the fluidic die (FIG. 1, 180). In this example, the actuator (302) may supply a pressure pulse upstream from the fluid ejection chamber (304) and the opening (303). While specific reference is made to an off-assembly actuator (302) that generates a pressure pulse, any device used to create pressure within the fluid ejection chamber (304) in order to drive fluid from the opening (303) and that is also located separate from the fluid ejection subassembly (181) or off of the fluid die (FIG. 1, 180) may be used.

FIG. 4 is a perspective view of an array of nanowells (154) and a plurality of fluidic dies (180-1, 180-2) with ejection subassemblies (181) having pitches that match nanowell (154) spacing, according to an example of the principles described herein. For simplicity in FIG. 4, select instances of certain components are indicated with reference numbers.

As described above, a substrate (150), such as a titration plate, may include an array of nanowells (154). The array of nanowells (154) may be divided into different groups (405-1, 405-2). While FIG. 4 depicts two groups (405-1, 405-2), the array of nanowells (154) may be divided into any number of groups (405), including one group.

As described above, each fluidic die (180-1, 180-2) includes an array of ejection subassemblies (181) that each eject an amount of fluid into the nanowells (154), either simultaneously or asynchronously.

As with the nanowells (154), fluid ejection subassemblies (181), may be grouped. The grouping of ejection subassemblies (181) may align with the groups (405) of the nanowells (154). In an example, each nanowell (154) may define an individual location where an analyte and/or reaction is to be placed and conducted. In this example shown in FIG. 4, multiple fluidic die (180-1, 180-2) that are arranged together allow multiple groups (405-1, 405-2) of nanowells (154) to be filled using the fluid ejection subassemblies (181) of different fluidic die (180-1, 180-2). That is, ejection subassemblies (181) of a first fluidic die (180-1) are used to fill a first group (405-1) of the nanowells (154) and the ejection subassemblies (181) of a second fluidic die (180-2) are used to fill a second group (405-2) of the nanowells (154). Thus, each of the plurality of fluidic die (180) may include a group of fluid ejection subassemblies (181) that address different groups (405) of nanowells (154) within the array of nanowells (154) on the substrate (150). Each of these fluidic die (180-1, 180-2) may then be moved simultaneously to be aligned with, and dispense fluid into, additional groups (405) of wells (154).

In one example, the different fluidic die (180-1, 180-2) depicted in FIG. 4 may eject different fluids. Doing so may allow reactions between different dispensed fluids to take place by dispensing these different fluids into the nanowells (154) in turn. That is, ejection subassemblies (181) of the first fluidic die (180-1) may eject a first fluid into a first group (405-1). The ejection head (FIG. 1, 102) and/or the substrate (150) can then be moved to align the first group (405-1) of nanowells (154) with the ejection assemblies (181) of the second fluidic die (180-2) such that a different fluid, can be combined in the first group (405-1) of nanowells (154).

Although FIG. 4 shows a specific number of nanowells (154) grouped into a specific number of groups (405), this is meant merely as an example. In one example, the array of nanowells (154) may be partitioned into any number of groups (405). Further, any number of nanowells (154) may be arranged in any manner. The number of fluidic die (180), and the number of ejections of fluid from fluid ejection subassemblies (181) of the fluidic die (180) may determine how much fluid each of the nanowells (154) contains at any given point in time. This may be accomplished by determining the amount of fluid ejected from the ejection subassemblies (181) and multiplying that volume (e.g., in picoliters) by the number of ejections of fluid into any given nanowell (154).

The use of fluidic die (180) with their ejection subassemblies (181) allows for a device that can fill the nanowells (154) without spilling the fluid into neighboring wells defined in or on the substrate (150). This prevents contamination or cross-contamination within any given nanowell (154) between analytes and/or other diagnostic or analytic materials described herein. This is because 1) the size of the inlets of the openings (FIG. 3, 303) of the ejection subassemblies (181) allows the openings (FIG. 3, 303) of the ejection subassemblies (181) to precisely eject the fluid into the relatively small target area of the nanowell (154) and 2) the spacing of the ejection subassemblies (181) matches the spacing of wells on the titration plate. Further, because the fluidic die (180) does not touch the substrate (150), this prevents any cross-contamination and/or contamination between the nanowells (154).

Figure 5:
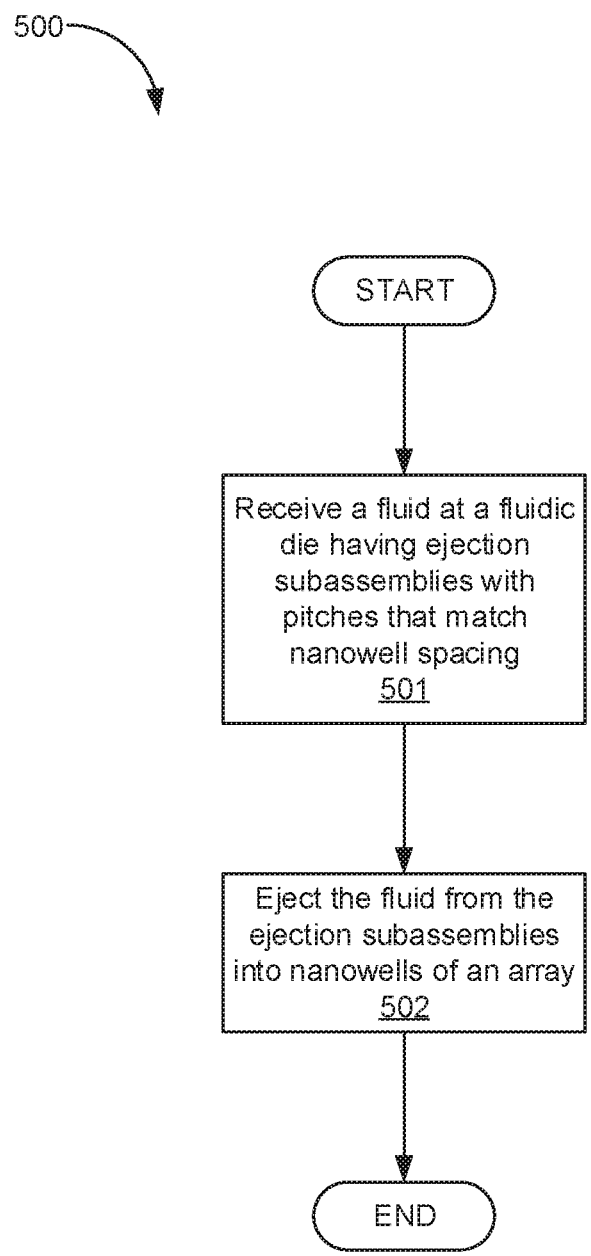
FIG. 5 is a flowchart showing a method of dispensing fluid into a nanowell substrate, according to an example of the principles described herein.

FIG. 5 is a flowchart showing a method (500) of dispensing fluid into a nanowell substrate (FIG. 1, 150), according to an example of the principles described herein. According to the method (500), a fluid is received (block 501) at a fluidic die (FIG. 1, 180) which fluidic die (FIG. 1, 180) includes ejection subassemblies. (FIG. 1, 181). The ejection subassemblies (FIG. 1, 181) have a pitch, or spacing that matches the spacing of nanowells (FIG. 1, 154) on a substrate (FIG. 1, 150). The fluid is then ejected (block 502) into at least one group of nanowells (FIG. 1, 154) of a nanowell substrate (FIG. 1, 150).

In some examples, the fluidic die (FIG. 1, 180) may include a number of fluid ejection subassemblies (FIG. 1, 181) that is equivalent to the number of nanowells (FIG. 1, 154) in the nanowell substrate (FIG. 1, 150), and fluid from the fluid ejection subassemblies (FIG. 1, 181) of the fluidic die (FIG. 1, 180) may be dispensed without movement of the fluidic die (FIG. 1, 180) to a second or any subsequent group (FIG. 4, 405) of nanowells (FIG. 1, 154).

Figure 6:
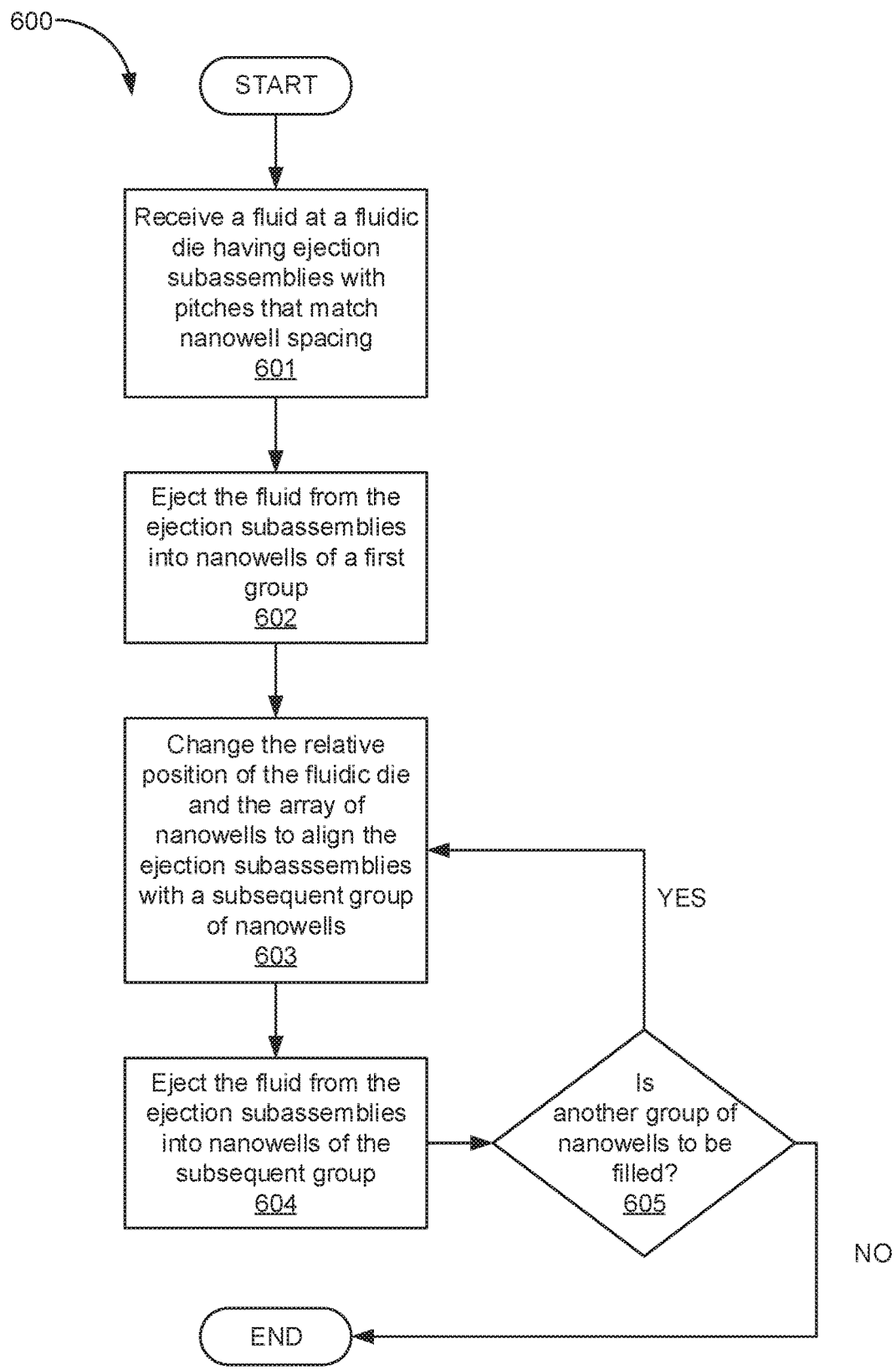
FIG. 6 is a flowchart showing a method of dispensing fluid into a nanowell substrate, according to another example of the principles described herein.

However, as described above, the ejection of fluid may be into more than one group (FIG. 4, 405). Accordingly, FIG. 6 is a flowchart showing a method (600) of dispensing fluid into multiple groups (FIG. 4, 405) of nanowells (FIG. 1, 154), according to another example of the principles described herein. FIG. 6 describes the motion of a single fluidic die (FIG. 1, 180).

According to the method (600), fluid (block 601) is received at a fluidic die (FIG. 1, 180) and ejected (block 602) into a first group (FIG. 4, 405-1) of nanowells (FIG. 1, 154). This may be performed as described above in regards to FIG. 5. Next, the relative position of the fluidic die (FIG. 1, 180) and the array of nanowells (FIG. 1, 154) is changed (block 603) to align the ejection subassemblies (FIG. 1, 180) with a subsequent group, such as a third group (FIG. 4, 405-3). Such a change in relative position may include moving one, or both of the ejection head (FIG. 1, 102) and the substrate stage (FIG. 1, 151) on which the substrate (FIG. 1, 150) is disposed. The fluid is then ejected (block 604) into the subsequent group, such as group (FIG. 4, 405-3) of nanowells (FIG. 1, 154) of a nanowell substrate (FIG. 1, 150). Additional fluidic dies (FIG. 4, 180-2) may be moved in concert from, for example, a second group (FIG. 4, 405-2) to a fourth group (FIG. 4, 405-4).

A determination (block 604) may then be made as to whether additional groups (FIG. 4, 405) of nanowells (FIG. 1, 154) are to be filled with fluid. If no additional groups (FIG. 4, 405) of nanowells (FIG. 1, 154) are to be filled (block 605, determination NO), then the method (600) may terminate. If, however, a subsequent group(s) (FIG. 4, 405) of nanowells (FIG. 1, 154) is to be filled (block 605, determination YES), then the method (600) may return to changing (block 603) the relative position of the fluidic die (FIG. 1, 180) and the array of nanowells (FIG. 1, 154) and to the ejecting (block 604) of fluid into the subsequent group(s) (FIG. 4, 405) of nanowells (FIG. 1, 154). This may repeated as many times as may be instructed in order to eject fluid into any number of nanowells (FIG. 1, 154) in the nanowell substrate (FIG. 1, 150).

In summary, because the pitch of the ejection subassemblies (FIG. 1, 180) of aligns with and matches the pitch of the nanowells (FIG. 1, 154) of a substrate (FIG. 1, 150), spillover during the filling of the nanowells (FIG. 1, 154) is reduced. Further, the potential for fluid to be deposited onto the space between the nanowells (FIG. 1, 154) is also reduced. Accordingly, the use of fluidic dies (FIG. 1, 180) that include the ejection subassemblies (FIG. 1, 181) provides precise control over dispensed fluid volumes. Moreover, the alignment of ejection subassemblies (FIG. 1, 180) and wells (FIG. 1, 154) enables rapid ejection of fluid across the substrate (FIG. 1, 150).

Further, the dispensing of fluid from the fluidic dies (FIG. 1, 180) allows for the fluid to be completely dispensed within the nanowells (FIG. 1, 154) in a non-contaminating fashion and to increase titration plate filling rates. Still further, using multiple ejection subassemblies (FIG. 1, 180) reduces the number of fluidic die (FIG. 1, 180) that may otherwise be used for filling large titration plates that include a large number of nanowells (FIG. 1, 154), and minimizes any fluidic die-to-fluidic die alignment issues.

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluidic ejection system comprising:
   a fluidic die comprising:
      a plurality of ejection subassemblies, wherein each ejection subassembly comprises:
         a fluid actuator;
         an ejection chamber to hold a volume of fluid; and
         an opening through which the volume of fluid is ejected via the fluid actuator;
   a substrate comprising an array of nanowells, wherein a pitch of the plurality of ejection subassemblies matches a spatial arrangement of nanowells of the array of nanowells on the substrate, and
   wherein the plurality of ejection subassemblies are fixed in a first position and configured to address a first group of nanowells comprising a first portion of the array of nanowells on the substrate corresponding to the fixed position of the plurality of ejection subassemblies, and a processing device, wherein the plurality of ejection subassemblies are configured to address a second group of nanowells comprising a second portion of the array of nanowells on the substrate when the substrate is instructed, by the processing device, to move relative to the fixed position of the plurality of ejection subassemblies such that the second group of nanowells comprising the second portion of the array of nanowells on the substrate corresponds to the fixed position of the plurality of ejection subassemblies.

2. The fluidic die of claim 1, wherein the pitch of the ejection subassemblies is such that each ejection subassembly ejects fluid into one of the nanowells of the array of nanowells.

3. The fluidic die of claim 1, wherein the plurality of ejection subassemblies simultaneously eject fluid into corresponding nanowells of the array of nanowells.

4. The fluidic die of claim 3, wherein a first ejection subassembly ejects fluid into one well and a second ejection subassembly ejects fluid into a second well simultaneously.

5. The fluidic die of claim 1, wherein:
the fluidic die is one of a plurality of fluidic die which are arranged together; and
each of the ejection subassemblies of the plurality of fluidic die eject fluid into the array of nanowells.

6. The fluidic die of claim 5, wherein the ejection subassemblies address a group of nanowells that is different from a group of nanowells addressed by other fluidic die of the plurality of fluidic die.

7. A fluid ejection system comprising:
a substrate comprising an array of nanowells;
a substrate stage to hold the substrate;
an ejection head comprising:
at least one fluidic die, a fluidic die comprising a plurality of ejection subassemblies, wherein:
each ejection subassembly comprises a fluid actuator, an ejection chamber to hold a volume of fluid and an opening through which the volume of fluid is ejected via a fluid actuator;
each ejection subassembly ejects fluid into nanowells of the array of nanowells; and
a pitch of the ejection subassemblies on the fluidic die matches a spatial arrangement of nanowells of the array of nanowells,
wherein the plurality of ejection subassemblies are fixed in a first position and configured to address a first group of nanowells comprising a first portion of the array of nanowells on the substrate correspoonding to the fixed positioin of the plurality of ejection subassemblies, and
a processing device, wherein the plurality of ejection subassemblies are configured to address a second group of nanowells comprising a second portion of the array of nanowells on the substrate when the substrate is instructed, by the processing device, to move relative to the fixed position of the plurality of ejection subassemblies such that the second group of nanowells comprising the second portion of the array of nanowells on the substrate corresponds to the fixed position of the plurality of ejection subassemblies.

8. The fluid ejection system of claim 7, wherein the ejection head moves relative to the substrate stage.

9. The fluid ejection system of claim 7, wherein the ejection subassemblies simultaneously eject fluid into corresponding nanowells.

10. The fluid ejection system of claim 7, wherein ejection subassemblies of different fluidic die address different groups of nanowells within the array of nanowells.

11. The fluidic ejection system of claim 7, wherein the fluid actuator is disposed within the ejection chamber.

12. The fluidic ejection system of claim 7, wherein the fluid actuator is disposed off of the fluidic die.

13. A method of ejecting fluid into an array of nanowells, comprising:
receiving a fluid at a fluidic die of an ejection head; and
with a plurality of ejection subassemblies of the fluidic die, ejecting the fluid into at least one group of nanowells of the array of nanowells;
wherein:
a pitch of the ejection subassemblies matches a spatial arrangement of the nanowells;
each of the ejection subassemblies ejects fluid into one of the nanowells;
the plurality of ejection subassemblies are fixed in a first position and configured to address a first group of nanowells comprising a portion of the array of nanowells on the substrate corresponding to a position of the plurality of ejection subassemblies, and
wherein the plurality of ejection subassemblies are configured to address a second group of nanowells comprising a second portion of the array of nanowells on the substrate when the substrate is instructed, by a processing device, to move relative to the fixed positioin of the plurality of ejection subassemblies such that the second group of nanowells comprising the second portion of the array of nanowells on the substrate corresponds to the fixed position of the plurality of ejection subassemblies.

14. The method of claim 13, wherein:
the at least one group of nanowells comprises a plurality of nanowells; and
ejecting the fluid into the at least one group of nanowells comprises:
with the plurality of ejection subassemblies of a fluidic die, ejecting fluid into the first group of nanowells of the array of nanowells;
changing the relative position of the fluidic die and the array of nanowells to align the plurality of ejection subassemblies with a second group of nanowells; and
with the plurality of ejection subassemblies of a fluidic die, ejecting fluid into the second group of nanowells.

15. The method of claim 13, wherein the plurality of ejection subassemblies simultaneously eject fluid into corresponding nanowells.

* * * * *